(No Model.)

W. C. WEATHERLY.
GLUE HEATER.

No. 280,540. Patented July 3, 1883.

WITNESSES:

INVENTOR:
W. C. Weatherly
BY
ATTORNEYS.

UNITED STATES PATENT OFFICE.

WARREN C. WEATHERLY, OF GRAND RAPIDS, MICHIGAN.

GLUE-HEATER.

SPECIFICATION forming part of Letters Patent No. 280,540, dated July 3, 1883.

Application filed March 10, 1883. (No model.)

*To all whom it may concern:*

Be it known that I, WARREN C. WEATHERLY, of Grand Rapids, in the county of Kent and State of Michigan, have invented a new and Improved Glue-Heater, of which the following is a full, clear, and exact description.

My invention consists of a glue heater or pot adapted to be used with a heating-chamber and made adjustable thereon, whereby the temperature of the pot may be regulated with great nicety by increasing or diminishing its contact-surface with the heating-chamber.

Reference is to be had to the accompanying drawings, forming part of this specification, in which similar letters of reference indicate corresponding parts in all the figures.

Figure 1:
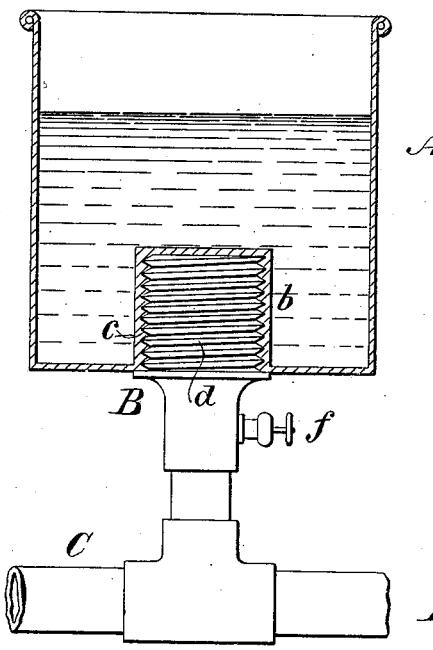
Figure 2:
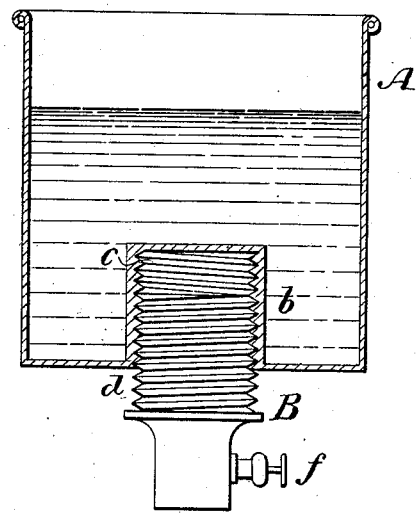
Figure 3:
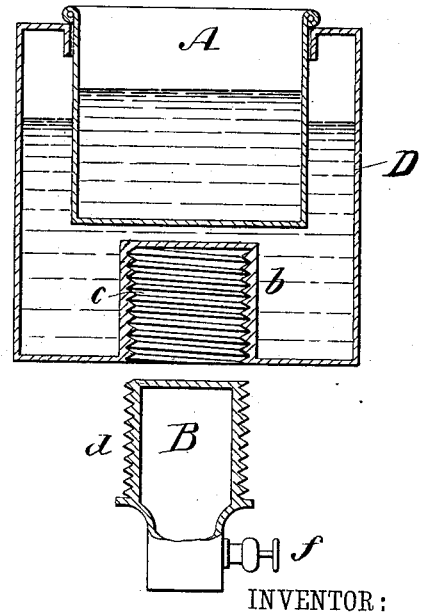

Figure 1 is a sectional elevation of my invention, showing the heater or pot screwed entirely down upon the heating-chamber. Fig. 2 shows the pot raised for diminishing the heat of the pot, and Fig. 3 shows the glue heater or pot used with a water-jacket and with the heating-chamber detached.

A represents the glue heater or pot, and B represents the heating-chamber, which is connected with the pipe C, which supplies it with steam or hot water as the heating medium. The heater or pot A has the recess $b$ formed in it, adapted to receive the heating-chamber B, as shown, and the pot is made adjustable upon the heating-chamber, preferably, by means of the screw-threads $c\,d$, formed, respectively, in the recess and upon the outside of the heating-chamber.

$f$ is an air-vent or test-cock for testing the steam or water in the heating-chamber.

The pipe C will lead from some water-heating apparatus or from a steam-boiler, and thus supply steam or hot water to the heating-chamber B, which will heat the material in the pot A, and by adjusting the pot up or down upon the heating-chamber the heat in the pot may be regulated with great accuracy, so that the material in the pot may be maintained at any desired temperature.

The pot may be used with or without a water-jacket, D. If used with a water-jacket, the recess $b$, to receive the heating-chamber, will be formed in the bottom of the water-jacket instead of in the glue-pot, as shown in Fig. 3, and the glue-pot will be made removable from the water-jacket, as shown in said Fig. 3.

Constructed in this manner the device is very cheap and simple, may be readily removed for cleaning or for change of location, and the heat may be easily and very accurately regulated.

Having thus described my invention, I claim as new and desire to secure by Letters Patent—

The pot A, having the screw-threaded recess $b$, in combination with the screw-threaded heating-chamber B, substantially as and for the purposes set forth.

WARREN C. WEATHERLY.

Witnesses:
FRANK E. PULTE,
JOHN H. BRONWER.